United States Patent
Berger et al.

(10) Patent No.: US 11,169,070 B2
(45) Date of Patent: Nov. 9, 2021

(54) CONDENSATION PARTICLE COUNTER WITH FLOOD PROTECTION

(71) Applicant: AVL LIST GMBH, Graz (AT)

(72) Inventors: Christos Berger, Graz (AT); Martin Cresnoverh, Graz (AT); Gergely Kerekgyarto, Graz (AT)

(73) Assignee: AVL LIST GMBH, Graz (AT)

( * ) Notice: Subject to any disclaimer, the term of this patent is extended or adjusted under 35 U.S.C. 154(b) by 847 days.

(21) Appl. No.: 15/776,080

(22) PCT Filed: Nov. 17, 2016

(86) PCT No.: PCT/EP2016/078002
§ 371 (c)(1),
(2) Date: May 15, 2018

(87) PCT Pub. No.: WO2017/085184
PCT Pub. Date: May 26, 2017

(65) Prior Publication Data
US 2020/0271562 A1 Aug. 27, 2020

(30) Foreign Application Priority Data
Nov. 17, 2015 (AT) .................................. A 740/2015

(51) Int. Cl.
*G01N 15/06* (2006.01)
*G01N 15/00* (2006.01)

(52) U.S. Cl.
CPC ... *G01N 15/065* (2013.01); *G01N 2015/0019* (2013.01)

(58) Field of Classification Search
CPC .................. G01N 15/06; G01N 2015/0019
See application file for complete search history.

(56) References Cited

U.S. PATENT DOCUMENTS

2006/0172428 A1  8/2006  McDermott et al.
2008/0148812 A1  6/2008  Wei et al.
(Continued)

FOREIGN PATENT DOCUMENTS

EP  0 462 413 A2  12/1991
EP  1 930 713 A1   6/2008
(Continued)

OTHER PUBLICATIONS

TSI Incorporated: "Model 3007 Condensation Particle Counter", Operation and Service Manual, 1930035, Revision C (2002).

*Primary Examiner* — Daniel S Larkin
(74) *Attorney, Agent, or Firm* — Norman B. Thot

(57) ABSTRACT

A condensation particle counter includes a saturation section, an aerosol inlet assigned to the saturation section, a condensation section, a measuring section for condensation particles, and an outlet section. The aerosol inlet allows a flow of an aerosol loaded with particles. Each of the condensation section, the measuring section and the outlet section are arranged downstream of the saturation section. A critical nozzle is arranged in the outlet section. The critical nozzle includes a critical nozzle inlet. A pump suctions the aerosol. An outlet line extends from the critical nozzle to the pump. A valve device is arranged in the outlet line between the critical nozzle and the pump. A pressure measuring device is arranged upstream of the critical nozzle inlet. The outlet line is entirely closed or partially closed by the valve device depending on a measurement value of the pressure measuring device.

10 Claims, 4 Drawing Sheets

(56) References Cited

U.S. PATENT DOCUMENTS

| | | | |
|---|---|---|---|
| 2008/0186489 A1* | 8/2008 | Ahn | G01N 15/065 |
| | | | 356/337 |
| 2009/0031786 A1 | 2/2009 | Takeuchi et al. | |
| 2010/0180666 A1 | 7/2010 | Huetter et al. | |
| 2013/0180321 A1 | 7/2013 | Shinohara et al. | |
| 2015/0160105 A1 | 6/2015 | Caldow et al. | |

FOREIGN PATENT DOCUMENTS

| | | | |
|---|---|---|---|
| EP | 2 194 370 A1 | 6/2010 | |
| EP | 2 208 983 A2 | 7/2010 | |
| JP | 61-076935 * | 4/1986 | ........... G01N 15/065 |
| WO | WO 2012/142297 A1 | 10/2012 | |

* cited by examiner

CONDENSATION PARTICLE COUNTER WITH FLOOD PROTECTION

CROSS REFERENCE TO PRIOR APPLICATIONS

This application is a U.S. National Phase application under 35 U.S.C. § 371 of International Application No. PCT/EP2016/078002, filed on Nov. 17, 2016 and which claims benefit to Austrian Patent Application No. A740-2015, filed on Nov. 17, 2015. The International Application was published in German on May 26, 2017 as WO 2017/085184 A1 under PCT Article 21(2).

FIELD

The present invention relates to a condensation particle counter with a saturation section to which is assigned at least one inlet for a flow of an aerosol loaded with particles, wherein a condensation section, a measuring section for condensation particles, and an outlet section are arranged downstream of the saturation section, and a critical nozzle is positioned in the outlet section, from which an outlet line leads to a pump for suctioning the aerosol. The present invention further relates to a method for operating such a condensation particle counter.

BACKGROUND

Condensation particle counters are optical measuring instruments for detecting small particles of solids having dimensions, for example, in the nm range, with which a carrier gas, for example, air, motor exhaust gases etc., is loaded. This carrier gas with the particles will hereinafter be referred to by the accepted technical term aerosol. Condensation particle counters are used, for example, in clean room technology or for measuring exhaust gas flows.

Solid particles in the nm range are too small to be detected directly by optical means. In order to make such solid particles measurable, condensation particle counters are used in which the aerosol, for example, an exhaust gas, is passed through an oversaturated atmosphere. The oversaturated atmosphere is generated, for example, by saturating the exhaust gas with vapors of an operating medium and subsequently cooling the exhaust gas. The solid particles then serve as condensation cores and are enlarged by heterogeneous condensation to such an extent that they can be detected optically. The size of the solid particles from which this condensation process starts depends on the oversaturation and is referred to as a Kelvin diameter. The smaller the Kelvin diameter is for a certain oversaturation, the smaller the solid particles can be that lead to a condensation of an operating medium. Corresponding to regulations, for example, legal requirements, a particle size range larger than 20 nm, typically 23 nm to 2.5 µm, must be detected, for example, for exhaust gases, and the exhaust gas must be conditioned to a temperature of <35° C. prior to the actual measurement. The size of the particles increases due to the condensation, for example, to approximately 5 µm. Particles of such a size can be detected individually by optical means, for example, using optical particle counters on the basis of scattered light.

A condensation particle counter basically comprises a saturation unit, a condensation unit, and a measuring cell, as will be described in detail further below. For the relevant prior art, reference is made, for example, to EP 0 462 413 B which describes a saturation unit with a cylindrical body of porous material which is adjoined at right angles by a condensation unit and a measuring unit. The operating fluid is here provided in a cavity of the saturation unit. Losses in operating fluid during the measuring operation are continuously compensated by a supply from outside.

EP 2 194 370 A1 describes a similarly designed device in which the saturation unit has a particular shut-off device for preventing the intrusion of operating medium into the measuring cell.

WO 2012/142297 A1 describes an example of a saturation unit for a condensation particle counter in which a porous body is penetrated by a plurality of channels through which the aerosol may flow.

US 2013/0180321 A1 describes a condensation particle filter of the type in issue wherein a porous body has a number of recesses in its circumference so as to counteract an undesired capillary action between the outer wall and the porous body.

A pump for suctioning the aerosol is arranged downstream of the actual measuring cell, wherein a critical nozzle is often positioned in the flow path between the measuring cell and the pump, as is described, for example, in EP 2 194 370 A1 mentioned above.

A drawback of the prior art solutions is that the particle counter may be flooded quickly when problems in supplying the aerosol arise, for example, if the aerosol clogs the line, is disconnected, or is shifted in some way. The operation of the downstream pump will then result in operating fluid being suctioned into sensitive areas of the counter, in particular into the measuring cell, and a failure of the apparatus occurs.

SUMMARY

An aspect of the present invention is to counter this problem in a manner which is as simple and reliable as possible.

In an embodiment, the present invention provides a condensation particle counter which includes a saturation section, at least one aerosol inlet assigned to the saturation section, a condensation section, a measuring section for condensation particles, and an outlet section. The at least one aerosol inlet is configured allow a flow of an aerosol loaded with particles. Each of the condensation section, the measuring section and the outlet section are arranged downstream of the saturation section. A critical nozzle is arranged in the outlet section. The critical nozzle comprises a critical nozzle inlet. A pump is configured to suction the aerosol. An outlet line is arranged to extend from the critical nozzle to the pump. At least one valve device is arranged in the outlet line between the critical nozzle and the pump. At least one pressure measuring device is arranged upstream of the critical nozzle inlet. The outlet line is configured to be entirely closed or partially closed by the at least one valve device depending on a measurement value of the at least one pressure measuring device.

BRIEF DESCRIPTION OF THE DRAWINGS

The present invention is described in greater detail below on the basis of embodiments and of the drawings in which.

DETAILED DESCRIPTION

Figure 1:
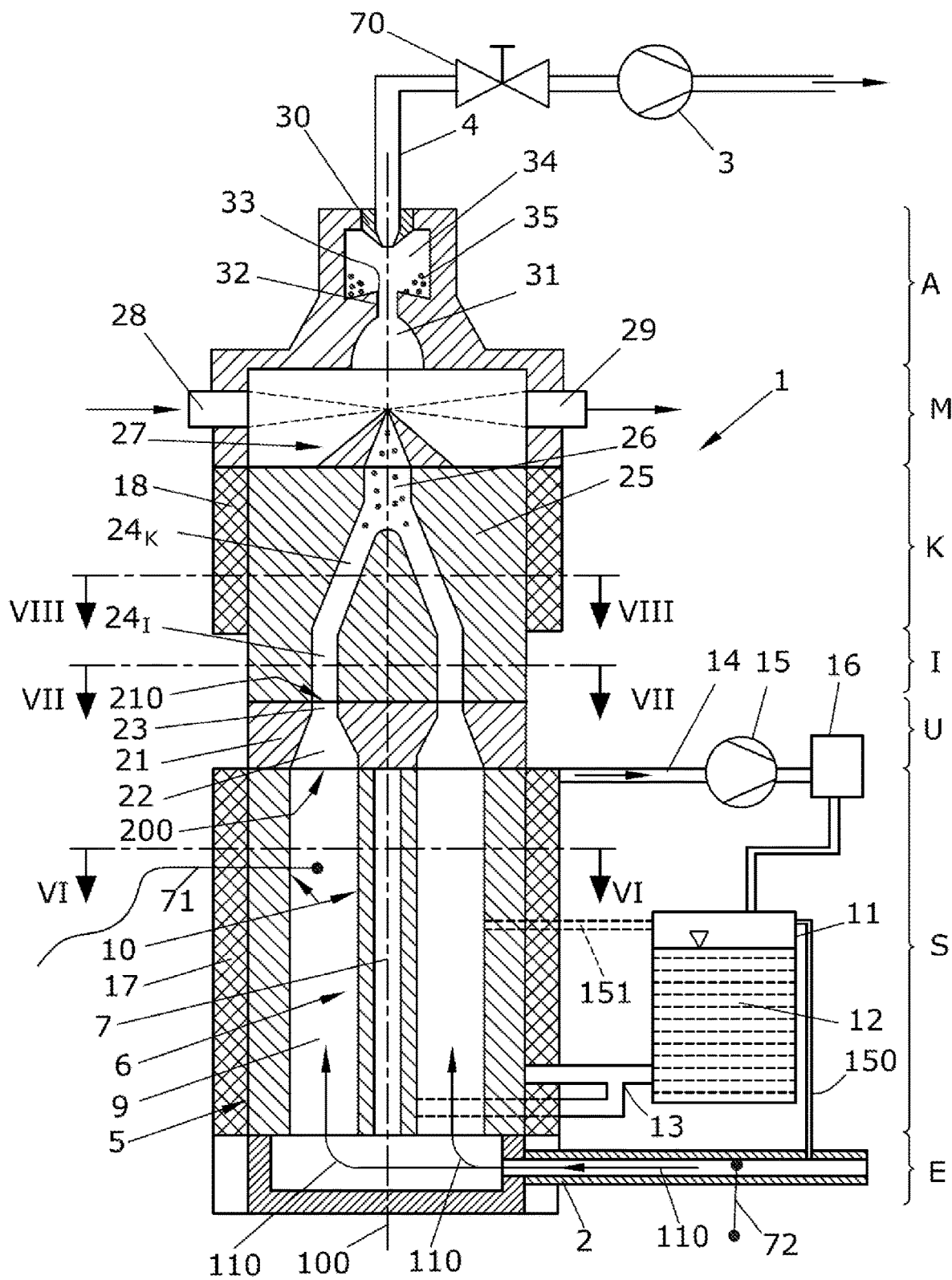
FIG. 1 shows a schematic simplified section through a condensation particle counter embodied according to the present invention.

In an embodiment, the present invention provides a condensation particle counter of the above-mentioned type with at least one valve device in the outlet line between the critical nozzle and the pump, and with at least one pressure measuring device arranged upstream of an inlet of the critical nozzle, wherein the outlet line can be entirely or partially closed by the valve device depending on a measurement value of the pressure measuring device.

The present invention significantly reduces the risk of a flooding or of defects in case of a shifting of the aerosol supply to the counter or of the flow path in the counter. When a problematic pressure value occurs upstream of the critical nozzle, the effect of the pump output on the flow path in the condensation particle counter can be reduced or switched off completely so that a suctioning of operating fluid into critical regions is prevented. Damages to the counter or possibly a failure thereof will thus not occur, and maintenance effort can be reduced.

In an embodiment of the invention, at least a first pressure measuring device can, for example, be arranged between the aerosol inlet into the condensation particle counter and an inlet of the critical nozzle facing the measuring section. It is thus possible to use the absolute pressure in the condensation particle counter to initiate an operation of the valve device in a simple manner.

Instead or in addition thereto, a second pressure measuring device according to another embodiment is designed as a differential pressure sensor and can, for example, be arranged in the inlet or upstream of the inlet. The second pressure measuring device advantageously allows for measuring the differential pressure between the inlet into the condensation particle counter and an ambient pressure of the condensation particle counter. This embodiment uses a differential pressure measurement to determine critical pressure conditions in the condensation particle counter.

Particularly good results are obtained if the outlet line can be entirely or partly closed by the valve device when the measurement value of the pressure measuring device undershoots a predetermined pressure limit value. It can thereby be provided that the acting pump output is reduced or switched off in the event of a negative pressure in the counter. Such negative pressure would cause the operating fluid to rise into sensitive regions and lead to long-term damages, at least to a temporary failure of the counter.

The present invention also provides for a method for operating a condensation particle counter in which the condensation particle counter comprises a saturation section to which is assigned at least one inlet for a flow of an aerosol loaded with particles, wherein a condensation section, a measuring section for condensation particles, and an outlet section are arranged downstream of the saturation section, and a critical nozzle is positioned in the outlet section, from which an outlet line leads to a pump for suctioning the aerosol, wherein at least one valve device is provided in the outlet line, wherein a measurement value of the pressure is determined upstream of an inlet of the critical nozzle and the outlet line is entirely or partially closed by the valve device depending on this measurement value. The pressure measurement value or the pressure value can basically be determined in any optional manner, be it by direct measurement or by considering other variables from which conclusions can be drawn on the pressure.

At least one pressure measuring device can be arranged upstream of an inlet of the critical nozzle to determine the pressure measurement value and/or the pressure value.

In an embodiment of the present invention, the valve device can, for example, entirely or partly close the outlet line when the measurement value undershoots a predetermined pressure limit value.

In an embodiment of the present invention, the absolute pressure in the condensation particle counter or a differential pressure with respect to the environment of the condensation particle counter can, for example, be determined as the pressure measurement value or pressure value.

The present invention and further advantages thereof will be explained in greater below under reference to the drawings.

Referring to FIG. 1, an embodiment of a condensation particle counter 1 according to the present invention will be described with reference to a simplified schematic illustration. A particle-loaded aerosol, which comes, for example, from the exhaust gases of an internal combustion engine, enters inlet section E of the condensation counter 1 via an aerosol inlet 2, for example, a tubular line, the aerosol being suctioned from the condensation particle counter 1 at its upper end through an outlet section A by a pump 3 via an outlet 4, i.e., an outlet line 4. A saturation section S, possibly a transfer section U, an insulation section I (the transfer section U and the insulation section I may also be combined into one component), a condensation section K, and a measuring section M are provided between the inlet section E and the outlet section A. All these sections with their possible variants, as well as their function, will be described in detail below.

The inlet section E has the function of providing a desired flow behavior, generally a laminar flow behavior, in the saturation section S downstream of the inlet section E in the flow direction 110 of the aerosol, as well as in the adjoining condensation section K. The specific design of the inlet section E, which is illustrated only schematically herein, is not, however, the subject matter of the present invention.

Figure 2:
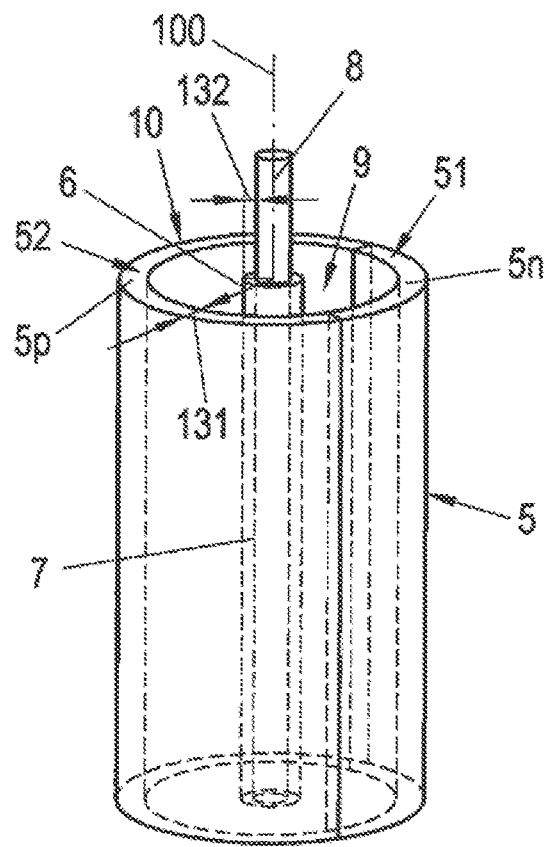
FIG. 2 is a diagrammatic illustration of an embodiment of a saturation body.

FIG. 2 shows, for example, a two-part saturation body 10 arranged in the saturation section S, which according to the shown embodiment is a hollow cylinder 5 with an inner cylinder 6 arranged concentrically thereto with respect to a longitudinal axis 100 of the saturation body 10, wherein the inner cylinder 6 is also formed as a hollow cylinder with an inner bore 7. The latter may, for example, receive a mechanically stabilizing and/or thermally conductive pin 8 (see FIG. 2) for temperature regulation. A gap 9 with an annular cross section is left between the two cylinders 5 and 6 for the throughflow of the aerosol in the flow direction 110 indicated by arrows in FIG. 1.

The material used for the two cylinders 5, 6, which in this case form a two-part saturation body 10, is an absorbent, porous material, for example, a sintered plastic material, a wick material or the like. In the shown embodiment, however, at least a section 5n (see FIG. 2), in the present case a sector of the hollow cylinder 5, is made of non-porous material such as, for example, aluminum or a plastic material, wherein the remaining section 5p is made of a porous material. If the porous material 5p is not self-supporting, net-like supporting structures can, for example, be used (not shown in the drawings). The section 5n shown in FIG. 2 has a partial cross-sectional area 51, as well as a material thickness having a partial radial length 131. The section 5*p* has a partial cross-sectional area 52, as well as a material thickness having a partial radial length 131. The inner cylinder 6 has a material thickness having a partial radial length 132.

An operating medium 12, for example, water, an alkane or an alcohol or another suitable medium, which is stored in an operating medium container 11, is supplied to the saturation body 10 via a line system 13, wherein the operating medium 12 condensed in the condensation particle counter 1 can be recirculated into the operating medium container 11 via a line 14, an operating medium pump 15 and a filter 16 or simply be discharged (not shown in the drawings). A dosing device or valves in the lines 13, 14, which are generally required for dosing or for flow control of the operating medium, are omitted from the drawings for the sake of clarity.

Since they are known to a skilled person, a heating unit 17 for the saturation section S, for example, a heating jacket, and a temperature control/cooling unit 18 for the condensation section K, are only indicated.

It is further known that problems in operating medium supply can occur with condensation particle counters having external operating medium containers due to pressure fluctuations between the pressure in the aerosol inlet or in the exhaust gas feed line to the condensation particle counter and the internal pressure in the operating medium container. Such pressure fluctuations can occur, for example, when the aerosol inlet is clogged. This may cause undesired difficulties in the measuring operation, such as, for example, a flooding of the aerosol flow path or even a flooding of the measuring section M with operating medium. Failures in the operating medium supply may likewise cause an undesired drying up of the saturation body.

To be able to prevent the above-mentioned failures and to provide a constant pressure equalization between the aerosol inlet 2 and the operating medium container 11, a pressure equalization line 150 between the aerosol inlet 2 and the operating medium container 11 is schematically drawn in the embodiment of the condensation particle counter 1 shown in FIG. 1. The pressure equalization line 150 advantageously serves to compensate for pressure differences between the aerosol inlet 2 and the operating medium container 11. As an alternative or in addition, a further pressure equalization line 151 is drawn in broken lines in FIG. 1, which extends from the operating medium container 11 directly into the saturation body 10 and serves for pressure equalization between the operating medium container 11 and the saturation section S. One or more further pressure equalization lines, which are not illustrated in this drawing, could likewise be arranged between the operating medium container 11 and the condensation section K if so required.

The oversaturated aerosol present in the saturation section S, which is heated to a predetermined temperature, flows through the condensation section K, which is cooled to a likewise predetermined temperature, where the operating medium condensates onto the particles present in the aerosol, thereby leading to the desired particle enlargement. The counting efficiency, i.e., the number of detected particles of a certain size, is low with very small particles, but increases very quickly. It is, for example, 50% at 23 nm in the particle size range from 15 to 35 nm, and reaches values of more than 90% for larger particles, typically from 40 nm on. It should also be noted that the temperature difference between the saturation section and the condensation section influences the particle size and/or the growth, whereby smaller particles are detected if the temperature difference is greater.

Figure 3:
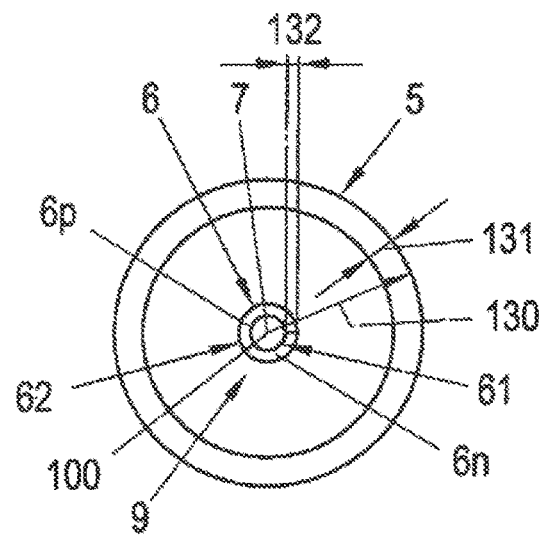
FIG. 3 is a section through another embodiment of a saturation body.

FIG. 3 shows that a sector-shaped section 6*n* of the inner cylinder 6 may consist of a non-porous material for a partial cross-sectional area 61, while the remainder of the inner cylinder is a section 6*p* of porous material having a partial cross-sectional surface 62. It should be noted here that the inner cylinder 6, which in the present case extends in the radial direction 130 by a partial length 132, does not necessarily have to be provided with an inner bore 7, but may also be designed as a solid cylinder.

Figure 4:
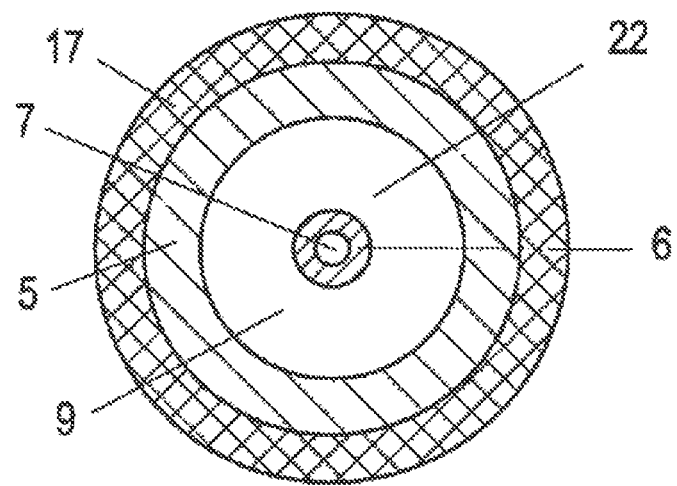
FIG. 4 is a section along plane VI-VI in FIG. 1.
Figure 5:
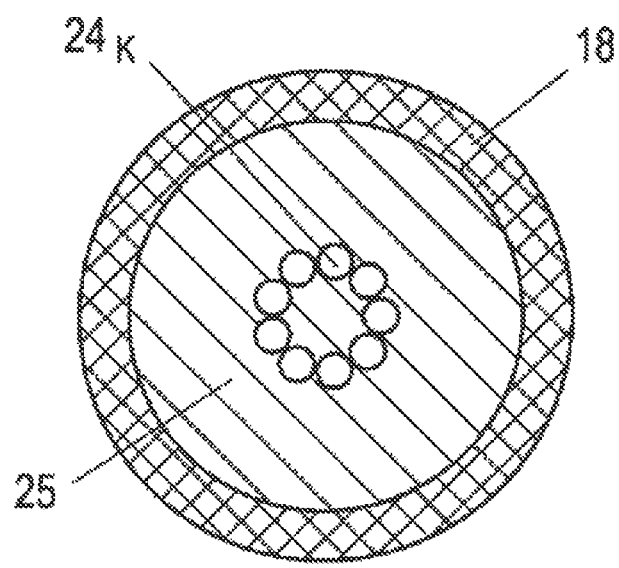
FIG. 5 is a section along plane VIII-VIII in FIG. 1.
Figure 6:
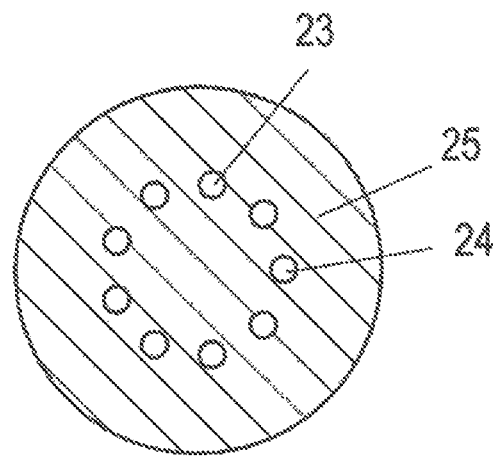
FIG. 6 is a section along plane VII-VII in FIG. 1.
Figure 7:
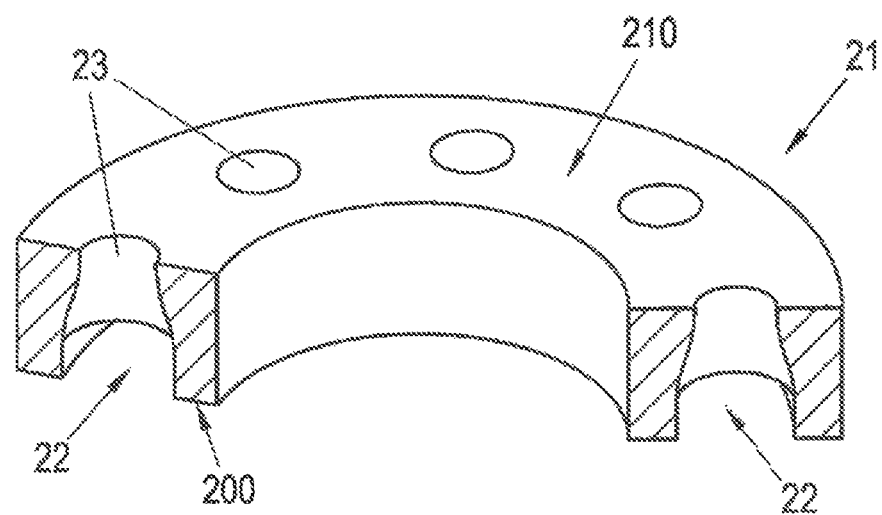
FIG. 7 is a sectional view of a transfer section for the transition from an annular gap to individual channels.

Referring back to FIG. 1 and with consideration to FIGS. 4-6, as well as to FIG. 7, the design of the transfer section U can be seen, which has the function of transferring the flow from the annular gap 9 in as laminar a manner as possible into a number of downstream individual channels. For this purpose, an annular insert 21 is provided in the shown embodiment whose lower side, which in the mounted position forms the inlet side 200 of the transfer section U or of the annular insert 21, comprises an opening 22 in continuation of the annular gap 9, the annular-gap-shaped opening 22 itself having the shape of an annular gap, wherein a number of individual channels 23, in the present case nine individual channels 23 (five of which are visible in FIG. 7), open into the annular gap-shaped opening 22 from the upper side of the annular insert 21 which is made, for example, of aluminum. The upper side of the annular insert 21 shown in FIG. 7 forms the outlet side 210 of the transfer section U, when in the mounted position. In an embodiment, the transfer section U or its annular insert 21 can, for example, be in a suitable thermally conductive connection with the saturation section S so as to prevent an undesired premature condensation in this region.

In this regard, an important aspect is a transition from the annular gap-shaped opening 22 into the individual channels 23 that is as steady as possible, so as to direct the flow of the aerosol without turbulences in a laminar manner further into individual channels $\mathbf{24}_I$ of the insulation section I or their continuation, i.e., individual channels $\mathbf{24}_K$ of the condensation section K. In this section, the individual channels $\mathbf{24}_K$ are formed in a condensation insert 25 in the upper portion of which they are combined into a single channel 26 which again opens into a singling nozzle 27 positioned upstream of or in the measuring section M. The sectional views in FIGS. 4-6 show that the annular gap 9 of the saturation section 5 (FIG. 4) has passed into individual channels 23 farther to the top in the insulation section I (FIG. 6). Still farther upward, in the region of the condensation section K, these individual channels 23 are already closer to each other (FIG. 5) to then merge into the only single channel 26 shortly before the singling nozzle 27.

The insulation section I with the individual channels $\mathbf{24}_K$, provided in this embodiment, although not ultimately necessary, provides for the thermal separation of the saturation section S from the condensation section K.

The actual counting of the particles enlarged by condensation and escaping from the singling nozzle 27 is performed in the measuring section M. In a manner known per se, a light unit 28 is provided for that purpose, for example, a focused laser light source, whose light beam impinges on particles leaving the singling nozzle 27. The scattered light generated is detected by a photodetector 29 and the signals generated are transmitted to an evaluation unit (not shown in the drawings). Other measuring methods may also be used.

After the measuring section M, the aerosol with the particles reaches the outlet section A which according to the present invention has a particular design which is to prevent a clogging of the critical nozzle 30 arranged at the outlet of the condensation particle counter 1. In a manner known per se, this critical nozzle 30 serves to set a constant volume flow and has a small diameter, typically 0.3 mm, thereby risking that, during operation, outflowing particles shift this small opening and thereby affect the measuring accuracy or make a measurement impossible.

To counter this disadvantage, an outlet line 31 from the measuring section M ends in a constricted region 32 in the outlet section A, which constricted region 32 opens into a particle capturing chamber 34 by a sharp swirl-inducing edge 33. The constricted region 32 and, in addition, the sharp swirl-inducing edge 33 cause a swirling of the aerosol flow which facilitates a deposition of particles primarily in the lower edge region 35 of the particle capturing chamber 34, where (FIG. 1) deposited particles are indicated.

For an effective prevention of the interferences with the measuring operation described above, such as, for example, the flooding of the flow path of the aerosol up to the flooding of the measuring section M with operating medium, which may occur in case of pressure fluctuations due, for example, to a clogging of the aerosol inlet 2, the following solution is provided: At least one adjustable valve device 70 is provided between the critical nozzle 30 (strictly speaking, between the outlet of the critical nozzle 30 averted from the measuring section M) and the pump 3. The adjustable valve device 70 may be adjusted dependent on a set value so that the outlet line 4 is closed partly or entirely in the region between the critical nozzle 30 and the pump 3.

The set value used is the measurement value of a pressure measuring device 71, 72 arranged upstream of an inlet of the critical nozzle 30 (an inlet of the critical nozzle 30 facing the measuring section M in the shown embodiment).

The pressure measuring device 71, 72 determines a pressure measurement value which is compared with a predetermined pressure limit value. In the embodiment discussed herein, the outlet line 4 is closed entirely or partly, when the pressure measurement value undershoots the pressure limit value. The processing of the measurement results and the output of the control variable to the valve device 70 is performed by a control unit (not shown in the drawings) which may, for example, be the control unit of the condensation particle counter 1.

The pumping action is thus reduced or switched off when a negative pressure occurs in the condensation particle counter 1 that could cause a flooding of the condensation particle counter 1 or damage to sensitive parts.

The pressure measuring device 71, 72 may be a first pressure measuring device 71 arranged between the aerosol inlet 2 into the condensation particle counter 1 and the above-described inlet of the critical nozzle 30. For this purpose, an optional pressure sensor may be used that can measure an absolute pressure or from the measurement of which an absolute pressure can be determined. The first pressure measuring device 71 thus measures the absolute pressure in the gas path inside the condensation particle counter 1.

In an embodiment of the present invention, a second pressure measuring device 72 can, for example, be alternatively or additionally provided which is arranged in the inlet 2 or upstream of the inlet 2 and which is configured as a differential pressure sensor. The differential pressure between the inlet 2 and an ambient pressure of the condensation particle counter 1 is here determined and used as the pressure measurement value.

The first pressure measuring device 71 and the second pressure measuring device 72 may be provided alone or in combination with each other. It is also possible to provide further pressure measuring devices in the region mentioned. It is further possible that the second pressure measuring device 72 is arranged in the gas path inside the condensation particle counter 1 as a differential pressure sensor similar to the first pressure measuring device 71.

The present invention thus allows for a method for operating a condensation particle counter 1 in which a pressure measurement value or pressure value is determined upstream of the critical nozzle 30, and an adjustable valve device 70 closes the outlet line 4 entirely or partly depending on this measurement value (for example, when the measurement value undershoots a predetermined pressure limit value). The pressure value can basically be determined in any optional manner (directly or from other available values). At least one pressure measuring device 71, 72 can, for example, be provided for that purpose. The pressure measurement value or pressure value used may be the absolute pressure in the condensation particle counter 1, as well as a differential pressure to the environment of the condensation particle counter 1.

A reduction of the cross section of the outlet line 4 can here be performed by the adjustable valve device 70, for example, in a first undershoot range, and the outlet line 4 may be closed entirely only after further undershooting of the pressure limit value. It is also possible, however, to shut the outlet line 4 completely immediately upon undershooting the pressure limit value.

The present invention prevents damage to the condensation particle counter 1 if, for example, by a shifting or a clogging of the aerosol supply or inside the condensation particle counter 1, a negative pressure occurs that would cause a flooding with operating medium.

The present invention is not limited to embodiments described herein; reference should be had to the appended claims.

What is claimed is:

1. A condensation particle counter comprising:
   a saturation section;
   at least one aerosol inlet assigned to the saturation section, the at least one aerosol inlet being configured allow a flow of an aerosol loaded with particles;
   a condensation section;
   a measuring section configured to measure condensation particles;
   an outlet section, each of the condensation section, the measuring section and the outlet section being arranged downstream of the saturation section;
   a critical nozzle arranged in the outlet section, the critical nozzle comprising a critical nozzle inlet;
   a pump configured to suction the aerosol;
   an outlet line arranged to extend from the critical nozzle to the pump;
   at least one valve device arranged in the outlet line between the critical nozzle and the pump; and
   at least one pressure measuring device arranged upstream of the critical nozzle inlet,
   wherein,
   the outlet line is configured to be entirely closed or partially closed by the at least one valve device depending on a measurement value of the at least one pressure measuring device.

2. The condensation particle counter as recited in claim 1, wherein the at least one pressure measuring device comprises a first pressure measuring device which is arranged between the at least one aerosol inlet and the critical nozzle inlet facing the measuring section.

3. The condensation particle counter as recited in claim 2, wherein the at least one pressure measuring device further comprises a second pressure measuring device which is designed as a differential pressure sensor.

4. The condensation particle counter as recited in claim 3, wherein the second pressure measuring device is arranged in the at least one aerosol inlet or upstream of the at least one aerosol inlet.

5. The condensation particle counter as recited in claim 3, wherein the second pressure measuring device is configured to measure a differential pressure between the at least one aerosol inlet and an ambient pressure of the condensation particle counter.

6. The condensation particle counter as recited in claim 1, wherein the outlet line is configured to be entirely closed or be partly closed by the at least one valve device if the measurement value of the at least one pressure measuring device undershoots a predetermined pressure limit value.

7. A method for operating a condensation particle counter, the method comprising:
   providing the condensation particle counter comprising:
      a saturation section,
      at least one aerosol inlet assigned to the saturation section, the at least one aerosol inlet being configured to allow a flow of an aerosol loaded with particles,
      a condensation section,
      a measuring section configured to measure condensation particles,
      an outlet section, each of the condensation section, the measuring section and the outlet section being arranged downstream of the saturation section,
      a critical nozzle arranged in the outlet section, the critical nozzle comprising a critical nozzle inlet,
      a pump configured to suction the aerosol,
      an outlet line arranged to extend from the critical nozzle to the pump, and
      at least one valve device arranged in the outlet line between the critical nozzle and the pump;
   determining a measurement value for a pressure upstream of the critical nozzle inlet; and
   closing the outlet line entirely or partly depending on the measurement value.

8. The method as recited in claim 7, wherein,
   the condensation particle counter further comprises at least one pressure measuring device arranged upstream of the critical nozzle inlet, and
   the at least one pressure measuring device is configured to determine the measurement value for the pressure.

9. The method as recited in claim 8, wherein the at least one valve device closes the outlet line entirely or partly if the measurement value undershoots a predetermined pressure limit value.

10. The method as recited in claim 8, wherein the measurement value for pressure is an absolute pressure in the condensation particle counter or a differential pressure to the environment of the condensation particle counter.

* * * * *